United States Patent [19]
James et al.

[11] Patent Number: 5,109,695
[45] Date of Patent: May 5, 1992

[54] MISFIRE DETECTION IN AN INTERNAL COMBUSTION ENGINE

[75] Inventors: John V. James, Walled Lake; James M. Dosdall, Grosse Ile; Kenneth A. Marko, Ann Arbor, all of Mich.

[73] Assignee: Ford Motor Company, Dearborn, Mich.

[21] Appl. No.: 710,841

[22] Filed: Jun. 5, 1991

Related U.S. Application Data

[63] Continuation-in-part of Ser. No. 572,650, Aug. 24, 1990, Pat. No. 5,044,195.

[51] Int. Cl.$^5$ ............................................. G01M 15/00
[52] U.S. Cl. ................................................... 73/117.3
[58] Field of Search ..................... 73/117.3, 112, 116; 364/431.07, 431.09, 431.05

[56] References Cited

U.S. PATENT DOCUMENTS

| | | | |
|---|---|---|---|
| 3,908,366 | 9/1975 | Masaki | 60/277 |
| 3,972,230 | 8/1976 | Hanson et al. | 73/116 |
| 4,015,467 | 4/1977 | Armstrong | 73/116 |
| 4,179,922 | 12/1979 | Bouverie et al. | 73/116 |
| 4,292,670 | 9/1981 | Reid et al. | 364/431 |
| 4,301,678 | 11/1981 | Full et al. | 73/116 |
| 4,386,406 | 5/1983 | Igarashi et al. | 73/1 H |
| 4,398,259 | 8/1983 | Levine | 364/551 |
| 4,532,592 | 7/1985 | Citron et al. | 364/431.05 |
| 4,691,288 | 9/1987 | Kay et al. | 364/511 |
| 4,886,029 | 12/1989 | Lill et al. | 123/479 |
| 4,932,379 | 6/1990 | Tang et al. | 123/436 |

OTHER PUBLICATIONS

James et al., "Microprocessor Based Data Acquisition for Analysis of Engine Performance", SAE Paper-870386.

Hadden et al., "Non-Contact Diagnosis of Internal Combustion Engine Faults Through Sensing", SAE Paper-760146.

Keebler, J., "Catalytic Killer", *Automotive News*, Jun. 11, 1990, p. 18.

*Primary Examiner*—Robert Raevis
*Attorney, Agent, or Firm*—Mark Mollon; Roger L. May

[57] ABSTRACT

A method and apparatus are provided for reliably detecting misfires in an internal combustion engine during actual driving conditions by monitoring fluctuations in engine speed between consecutive firing intervals. An average acceleration over a series of firing intervals is removed from an individual acceleration measurement corresponding to a particular firing interval to give an acceleration deviation which is then normalized to an expected torque to provide a power loss measurement. The power loss measurement indicates the occurrence of a misfire with a high signal-to-noise ratio. The information derived from misfire detection can be used to prevent destruction of a catalytic converter by unburned fuel mixtures and can be used to improve vehicle driveability by correcting for or indicating needed service for the vehicle. The misfire detection is implemented using existing sensors and processors and is adapted to be done on-board a vehicle in real time. Noise present in the acceleration data is measured and a no-test condition is recognized depending on the magnitude of the measured noise.

14 Claims, 9 Drawing Sheets

MISFIRE DETECTION IN AN INTERNAL COMBUSTION ENGINE

This application is a continuation-in-part of application Ser. No. 572,650 filed Aug. 24, 1990, now U.S. Pat. No. 5,044,195.

BACKGROUND OF THE INVENTION

The present invention relates in general to detecting misfires occurring during normal in-use vehicle operation of internal combustion engines, and more specifically to measuring power loss during each particular cylinder firing to identify the occurrence of misfires.

Most automobiles employ a catalytic converter to reduce the amount of pollutants in the engine exhaust. However, when a cylinder misfires so that no or incomplete combustion occurs, uncombusted fuel is introduced into the exhaust which burns in the hot catalytic converter. The heat from fuel burning in the catalytic converter destroys the catalyst. Thus, it becomes desirable to detect and count engine misfires and signal the operator of the vehicle upon occurrence of excessive misfires so that steps may be taken to protect the catalytic converter.

It is also desirable to detect misfires in order to allow adaptive control of the combustion engine in order to improve engine performance or to possibly eliminate the condition leading to misfire or remove fuel to the misfiring cylinder and thereby protecting the catalyst.

The identity of a misfiring cylinder and the frequency of misfires can be recorded for later use during diagnosis and repair of the vehicle.

Gas pressure from combustion in a properly firing cylinder accelerates the engine crankshaft during the power stroke of that particular cylinder. If a cylinder misfires instead of properly firing, then friction, compression occurring in other cylinders, and the presence of an external engine load combine to produce a net deceleration during the power stroke. The actual deceleration is normally small since engines are intentionally provided with a flywheel having large inertial mass to allow smooth operation in spite of the periodic power stroke pulsations and random fluctuations in power.

Decelerations are also caused by load and torque variations during vehicle operation. During other driving conditions, it may also be normal for no significant power to be produced by a particular cylinder firing, such as during a closed throttle deceleration. As a result of these difficulties, prior art attempts to detect misfires through crankshaft acceleration computed from crankshaft velocity measurements has met with limited success.

In Hanson et al, U.S. Pat. No. 3,972,230, it is shown that a misfire results in an abrupt reduction in instantaneous speed during the power period in which the misfire occurs. An engine is operated an idle speed and velocity measurements for about 200 consecutive power periods are collected. An average deceleration rate is found for each cylinder and individual deceleration rates are compared to the cylinder average deceleration rate to detect individual misfires. However, this method works only at idle speed and even then it requires averaging over many engine cycles in order to identify a misfiring cylinder because the technique has a poor signal-to-noise performance.

In Citron et al, U.S. Pat. No. 4,532,592, the change in instantaneous engine speed between successive cylinders provides a basis for determining the relative combustion efficiency of each cylinder. An index of performance is calculated based on crankshaft rotational time intervals which are digitally filtered. In order to get an accurate measure of the relative torque produced by a given cylinder, the index of performance is averaged over several successive firings. Furthermore, the method disclosed in this patent assumes that an engine is operating at steady-state so that the sum of individual performance indices over an integral number of engine cycles will tend to zero. Therefore, the method described in this patent is incapable of accurate misfire detection during nonsteady-state (i.e., transient) operation of an engine which constitutes the majority of normal driving conditions.

Accordingly, it is a principal object of the present invention to provide a method and apparatus for detecting misfires in an internal combustion engine.

It is a further object of this invention to detect misfires based on readily available engine operating data using sensors which are typically already present within an engine for other purposes.

It is another object of this invention to detect engine operating conditions which could cause damage to a catalytic converter.

It is still another object of this invention to prevent damage to a catalytic converter.

It is a further object of this invention to improve drivability of a vehicle by responding to the occurrence of misfires in order to reduce or eliminate further misfires.

It is yet another object of this invention to detect the occurrence of misfires over a full range of speed and load of an internal combustion engine, either during steady-state operation or transient operation.

It is a further object of this invention to detect misfires in real-time on board a moving vehicle, the misfire detection achieving extremely low error rates.

SUMMARY OF THE INVENTION

These and other objects are achieved according to the present invention wherein a parameter related to acceleration of an individual power stroke during engine combustion is normalized to an estimate of the engine torque that would be expected if the engine was operating without any misfires. The normalized acceleration provides a percent power loss for a corresponding cylinder or power stroke which is compared to a predetermined threshold to determine whether a particular firing event resulted in a misfire. Preferably, the estimated engine torque must be above a predetermined torque (which may be RPM dependent) in order for the comparison of normalized acceleration to be valid. Thus, estimated engine torque must be above the predetermined torque in order to signal the occurrence of a misfire.

In four-stroke engines having more than four cylinders, power strokes overlap. For example, in a six-cylinder engine the top dead center (TDC) of successive cylinders are 120° of engine rotation apart. The rotation interval between TDC's will be referred to as the firing interval of the cylinder at TDC at the beginning of the interval, although the actual spark for that cylinder may occur before top dead center. Thus, acceleration measurements are made once per firing interval so that the number of measurements during each engine cycle equals the number of cylinders in the engine. In a four-cylinder engine the firing interval corresponds to the power stroke.

The present invention removes effects on the acceleration measurements caused by transient operation accelerations and decelerations by removing an average engine acceleration using a median filter over a series of firing intervals substantially centered on a selected firing interval for which misfire detection is being performed.

The detected misfires can be counted and stored for further analysis or for indicating a warning to an operator of a vehicle when excessive misfires occur. If a particular cylinder continues to misfire, fuel flow may be stopped to that cylinder.

Parent application Ser. No. 572,650 describes the detection of engine load variations which cause contributions to the acceleration measurement. For example, road bumps may apply a torque to the drivetrain which is transmitted to the engine crankshaft Information concerning the load variations is obtained by sensing rapid changes in the height of the vehicle suspension with a height sensor. The information is used to correct the acceleration measurements or to detect the occurrence of an invalid testing condition. In order to avoid the need for the height sensor, the present invention detects the occurrence of an invalid test condition (i.e., a "no-test condition") by quantitatively measuring the noise present in the acceleration data. Measurements of the actual noise permit the recognition of an invalid test condition no matter what its cause, e.g., a closed throttle deceleration, a severe engine transient, or a road bump.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 16 plots power loss and measured loss error using the method of FIG. 15 for the acceleration values shown in FIG. 10.

FIG. 18 is a plot including a variable threshold as obtained according to the embodiment of FIG. 17.

Detailed Description of Preferred Embodiments

Figure 1:
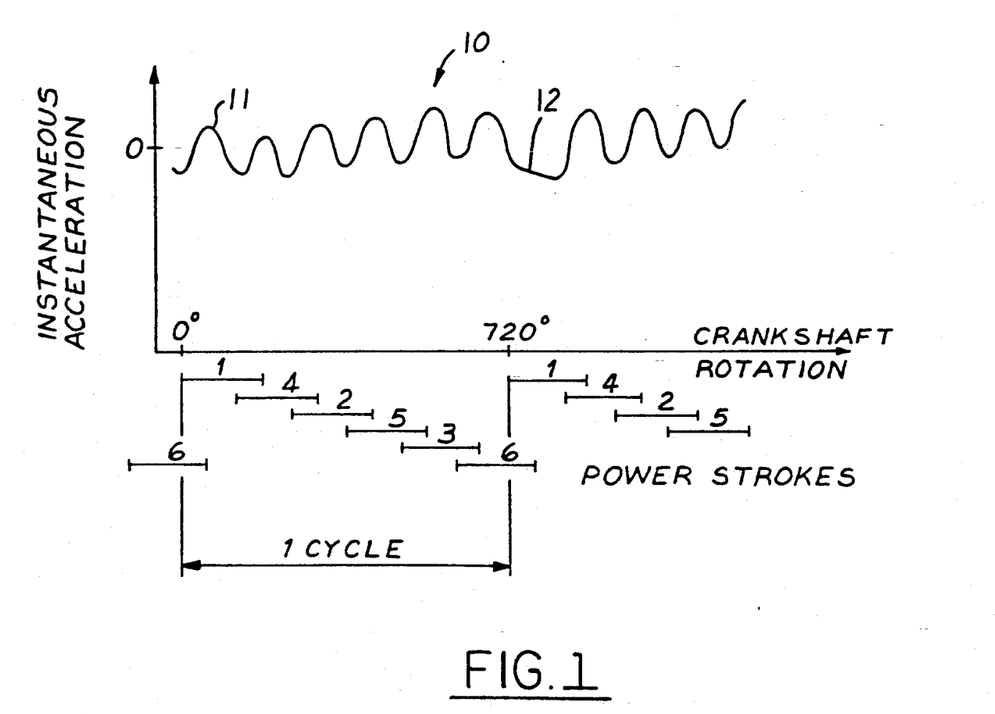
FIG. 1 is a plot showing instantaneous acceleration versus crankshaft rotation for normal and misfiring cylinders.

In the typical four-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation An acceleration peak 11 occurs during the firing interval of cylinder No. 1 and other maximums in the acceleration curve occur approximately corresponding to each other properly firing cylinder. Thus, although power strokes overlap, their individual effects are at least partially separable into distinct acceleration fluctuations.

When a misfire occurs such that no significant power is created by a cylinder during its firing interval, the crankshaft decelerates as indicated at 12. The deceleration continues at least during the time that the misfiring cylinder is the only cylinder in its power stroke.

Figure 2:
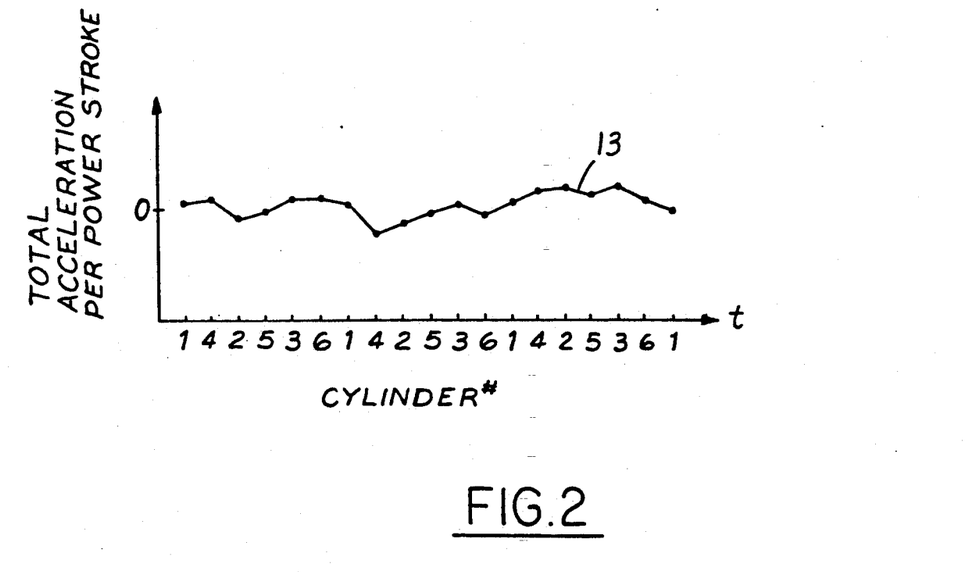
FIG. 2 is a plot showing typical total acceleration per firing interval versus cylinder number for an operating engine.

The accuracy required to measure angular rotation and time to derive the resolution shown in FIG. 1 is not feasible or desirable in on-board automotive systems. Rather, approximately one velocity measurement per firing interval is taken and the difference between successive velocities is calculated to determine one total acceleration measurement per cylinder Such acceleration calculations are plotted in FIG. 2. Curve 13 shows the variation which can be measured in the total acceleration between firing intervals of successive cylinders in the firing order of the combustion engine. Unfortunately, the curve shown in FIG. 2 has not proven to be a reliable indicator of misfires. Difficulties arise in attempting to separate acceleration fluctuations due to misfires from fluctuations caused by engine transients such as changes in vehicle speed or load. Even when transients are artificially removed by requiring engine operation at idle speed, prior art systems have lacked sufficient accuracy or have not properly isolated the effects of one cylinder firing interval from the adjacent firing intervals to allow any accurate detection of misfires.

The present invention provides a method for detecting cylinder misfires in a reliable way with extremely low error rates. According to the inventive method, the contribution to engine power of each cylinder is isolated from the effects of engine transients and the neighboring cylinders by subtracting an average acceleration over a series of surrounding cylinder firings from the acceleration calculated for the particular firing interval of interest. This removes the longer term acceleration effects which result from throttle and load variations. The acceleration average is preferably a median average to provide the best transient performance. However, a mean average can be used to reduce the computation required.

To maintain uniform sensitivity of misfire detection over all levels of engine speed and load, the acceleration deviation is normalized to a measure of expected torque before being subjected to a threshold for discriminating between misfires and proper firings. Expected torque is the amount of indicated torque that would be expected to be produced by a properly firing cylinder and can be calculated from such engine parameters as manifold pressure, throttle opening, air flow, fuel flow, spark advance, EGR fraction, or engine velocity.

The normalized acceleration deviation is equivalent to the percent of power loss exhibited by one cylinder firing relative to the average torque that is expected based on the engine operation. A histogram of the measured power loss from a running engine is strongly bimodal, with histogram peaks representing full engine power output and no output (i.e., misfire).

During some conditions, such as closed throttle decelerations or sudden throttle transients, it is normal for each individual cylinder firing to produce no significant power. Therefore, when such conditions are detected, the power loss test is suspended.

Figure 3:
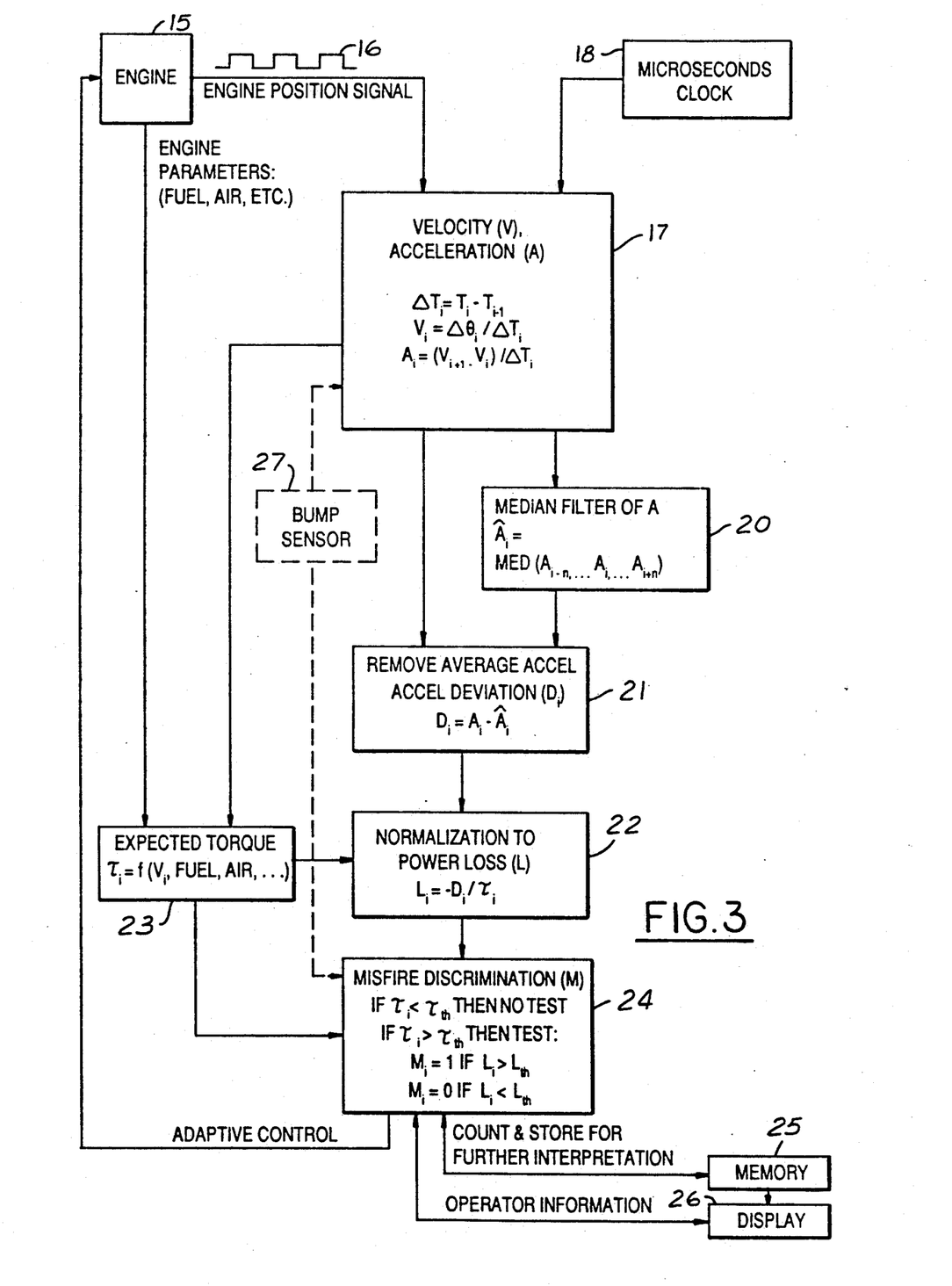
FIG. 3 is a block diagram showing the misfire detection of the present invention

Turning now to FIG. 3, the present invention is shown in greater detail. An engine 15 provides engine position signals 16 at predetermined rotational positions. Engine position signals 16 are provided to an acceleration block 17 which also receives clock signals from a clock 18 used to calculate velocity $V_i$ and acceleration $A_i$ for each firing interval i. For example, where each engine position pulse in engine position signal 16 is in predetermined relation with the beginning of a respective top dead center, then an elapsed time $\Delta T_i$ for an i'th firing interval is determined by the passage of time between the i'th position pulse and the i+1 position pulse (usually determined from pulse rising edge to rising edge) The velocity $V_i$ over firing interval i equals the angular rotation between rising edges divided by the time elapsed between their respective passage past a fixed point. Acceleration $A_i$ for firing interval i equals the immediately following velocity measurement $V_{i+1}$ minus the respective velocity $V_i$ divided by elapsed time period $\Delta T_i$. A preferred method for velocity and acceleration measurement is disclosed in copending application Ser. No 572,282, filed on Aug. 24, 1990, which is incorporated herein by reference in its entirety All of the calculations shown in FIG. 3 are preferably performed in an on-board microcomputer such as an electronic engine control (EEC) which is connected to various sensors and actuators within the engine.

The acceleration measurements $A_i$ are provided by acceleration block 17 to an averaging block 20. The $A_i$ measurements are preferably provided continuously or in large groups for processing. A series of acceleration measurements $A_{i-n}$ to $A_{i+n}$ are median averaged in order to determine the gross acceleration of the engine.

A difference block 21 receives the $A_i$ measurements from acceleration block 17 and the average accelerations $\bar{A}_i$ about each individual acceleration from averaging block 20. The difference between an individual acceleration and the average acceleration centered on that individual acceleration measurement provides an acceleration deviation $D_i$ which is an indication of the power contribution of i'th cylinder with engine transient effects removed. The acceleration deviation $D_i$ is provided to a normalization block 22.

A torque calculator 23 is connected to engine 15 for sensing various engine parameters according to any convenient engine model for estimating engine torque based on the sensed engine parameters. The engine model for relating the sensed parameters to indicated torque provided by the engine can be empirically measured by operating a vehicle on a dynamometer, for example. Thus, an engine could be operated at various air charges and RPMs to create a mapping of these variables to indicated torque as measured by the dynamometer The map can be stored in a lookup table in the engine microcomputer. During vehicle operation, the air charge and RPM are measured and the torque values from the lookup table are retrieved. The microcomputer can interpolate between values if the measured variables are between the values used during dynamometer measurements. Various offsets may also be employed according to other engine parameters as is known in the art.

Torque calculator 23 is also shown as being connected to acceleration block 17 since engine speed is a likely engine parameter for determining the expected torque to be delivered by engine 15. Expected torque is more slowly varying than engine acceleration measurements and therefore need not be updated at the frequency of every firing interval, although it may be best to do so.

The expected torque calculated in block 23 is provided to normalization block 22 and to a discriminator and analyzer 24. Normalization block 22 computes a power loss $L_i$ by dividing the negative acceleration deviation $-D_i$ by expected torque $\tau_i$. Power loss $L_i$ is provided to discriminator and analyzer 24 which performs two comparisons, in the preferred embodiment. In the first comparison, expected torque $\tau_i$ is compared to a torque threshold $\tau_{th}$. If the calculated expected torque is at least greater than a torque threshold, then discriminator and analyzer 24 performs a second comparison to separate misfires from normal firings. Thus, a digital value $M_i$ equals 1 to indicate that a misfire has occurred if power loss $L_i$ is greater than a power loss threshold $L_{th}$ and is assigned a value of zero when power loss is less than the power loss threshold. The no-test condition is assigned a value of $M_i$ equal to $-1$, for example.

The first comparison of expected torque versus a torque threshold prevents the second test from being performed when no significant power is being produced by engine 15. Torque threshold $\tau_{th}$ represents an amount of torque which is very small since even when engine 15 is at idle it is providing sufficient torque to enable a positive test for misfire. The value of expected torque $\tau_i$ will normally fall below the torque threshold only during closed throttle decelerations.

Figure 4:
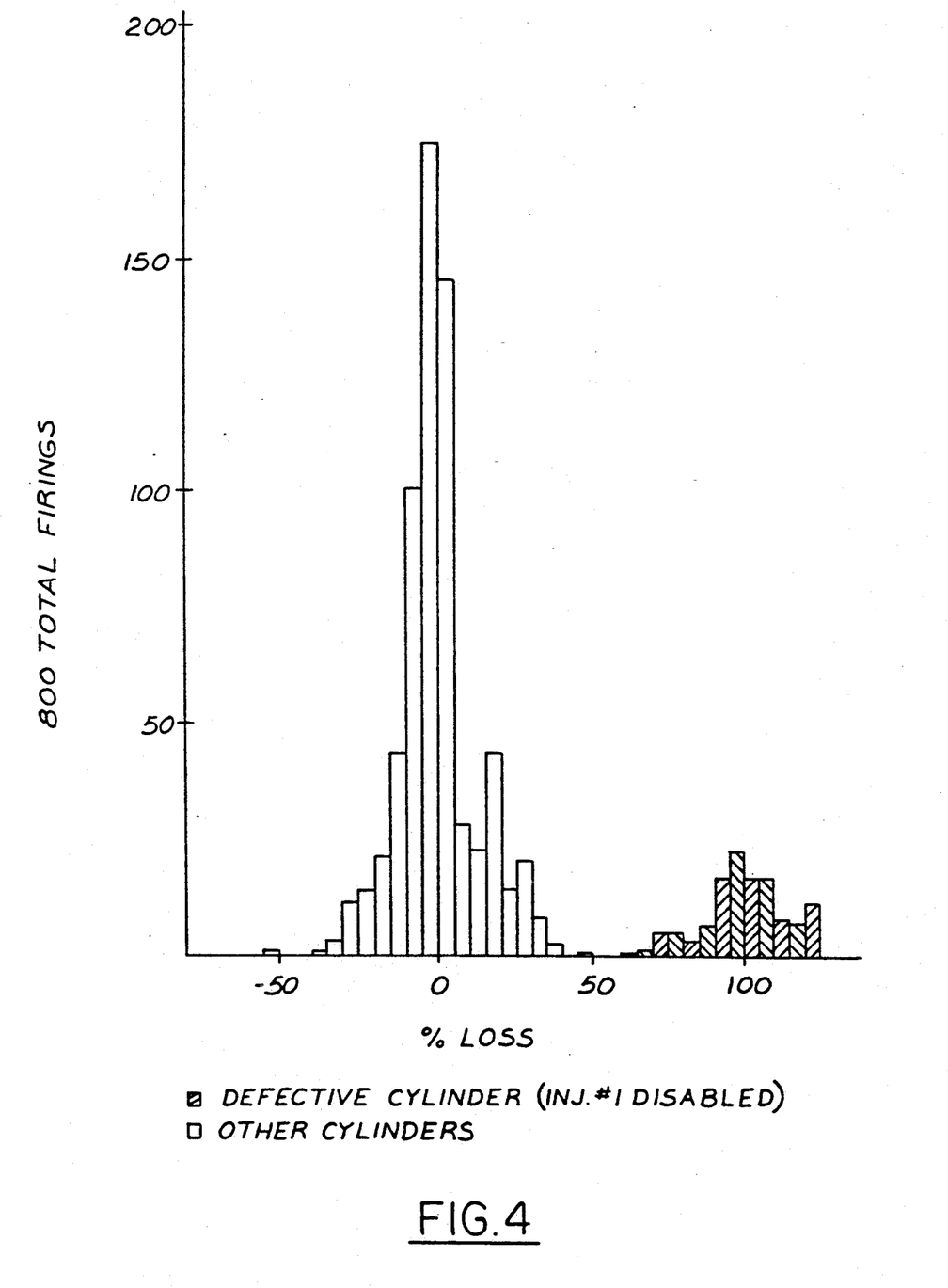
FIG. 4 is a histogram showing power loss measurements in an engine deliberately operated with a defective cylinder.

As shown in FIG. 4, the values for power loss $L_i$ are very strongly bimodal in that the values corresponding to the misfiring defective cylinder fall solely within one region of the histogram while values corresponding to all normally firing cylinders are contained within a separate area of the histogram. Thus, a power loss threshold $L_{th}$ is selected so that it falls between the separate regions in the histogram, e.g., at 50% power loss. The power loss threshold can also be adjusted upward or downward if it is desired to be more conservative or more liberal in calling a lower power firing a misfire.

Returning to FIG. 3, misfire data $M_i$ is provided to a memory 25 for later recall. The misfire data is also analyzed in discriminator and analyzer 24 in order to energize a display 26 or to provide adaptive control to engine 15 if desired.

Figure 5:
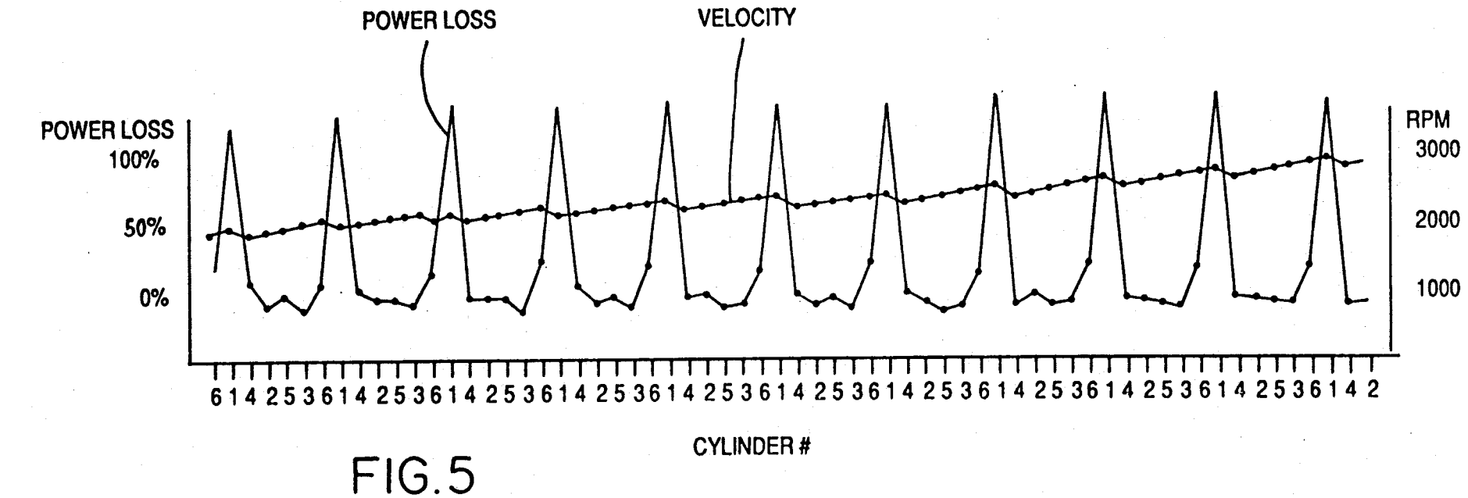
FIG. 5 is a plot showing power loss and engine speed for the same engine test as shown in FIG. 4.

FIG. 5 plots power loss and velocity during running of an engine operated with misfires deliberately introduced in cylinder No. 1. The plot of velocity shows a slight drop following the measurement corresponding to cylinder No. 1. It is clearly very difficult to identify misfiring cylinders based on velocity or just velocity differences (i.e., signal-to-noise in the measurement is low), especially when an engine is operating at high speed or accelerations. In contrast, the power loss plot provides a good separation between those cylinder firings which occur normally and those which correspond to a misfire (i.e., there is a high signal-to-noise ratio).

Figure 6A:
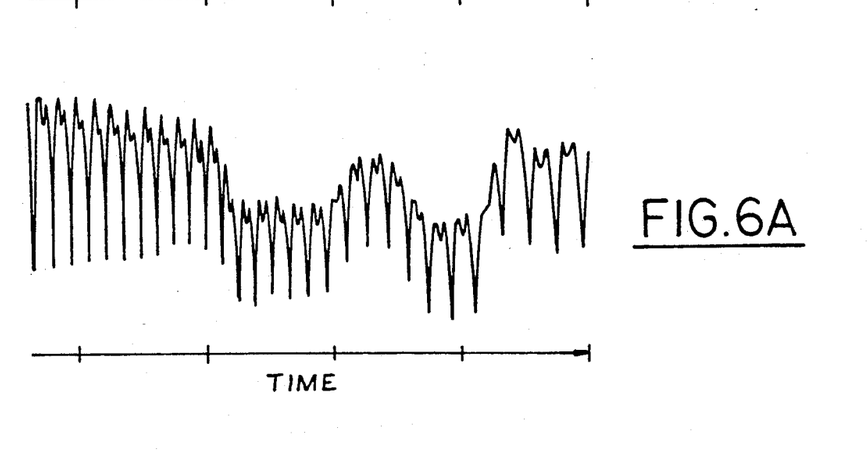
FIG. 6A is a plot of successive cylinder acceleration measurements during an engine transient.
Figure 6B:
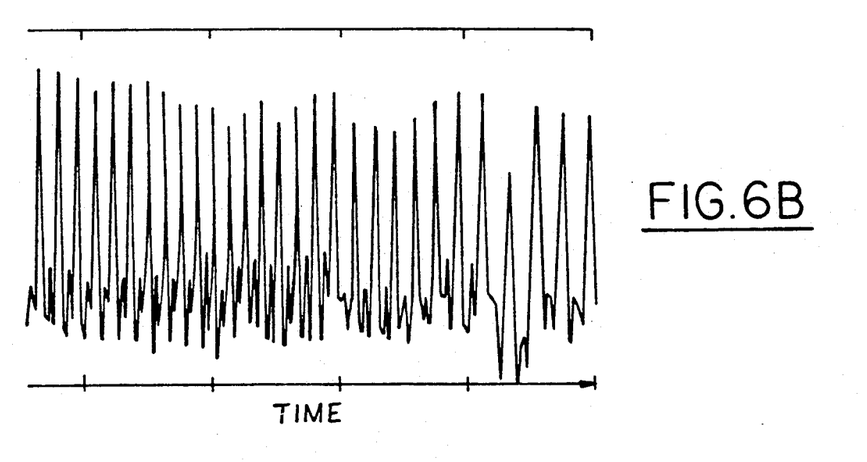
FIG. 6B is a plot of power loss during the transient of FIG. 6A.

Power loss calculation as a basis for detecting misfires is highly advantageous over similar attempts using acceleration calculation. FIG. 6A shows a plot of crankshaft acceleration during an engine transient. The baseline and the relative magnitude of the acceleration vary widely throughout the transient making it impossible to distinguish firing and misfiring cylinders by merely applying an acceleration threshold to the calculated acceleration. FIG. 6B plots power loss during the same engine transient shown in FIG. 6A. The power loss curve maintains substantially constant baseline and relative magnitudes during the engine transient. Misfiring cylinders can be distinguished from properly firing cylinders by application of a single threshold throughout the entire engine transient.

Returning to FIG. 3, misfire discriminator and analyzer 24 preferably processes the misfire data $M_i$ over many consecutive values for variable i so that variable $M_i$ can be examined for patterns indicative of particular engine operating faults such as a bad fuel injector or defective spark plug, for example. Thus, predetermined characteristics in the misfire data can be detected as a particular pattern and an appropriate response for the particular engine operating fault can be initiated.

The simplest pattern to appear in the misfire data would be the repeated misfiring of an individual cylinder on each of its successive firing intervals. The presence of misfires means that uncombusted fuel is being passed to the catalytic converter where it will burn, thereby increasing the temperature in the catalytic converter and leading to its destruction. In order to protect the catalytic converter, fuel supplied to the particular cylinder involved might be stopped if individual fuel injectors are provided for each cylinder.

Other patterns of misfiring, such as random misfires, can be correlated with other engine faults. An expert system or a pattern recognition system, such as a neural network, can be employed to relate a particular pattern of misfires and other data to a particular fault condition.

As shown in FIG. 3, a memory 25 can be employed to store the misfire data. Preferably, an electronically erasable programmable read-only memory (EEPROM) is employed for memory 25 so that misfire data is retained in memory 25 indefinitely for retrieval during vehicle servicing.

Display 26 is provided to notify an operator of the vehicle of a misfire condition. The operator might be notified of the occurrence of a single misfire. Preferably, the misfire data is analyzed in a manner to identify whether the misfiring of any individual cylinder occurs at greater than a predetermined frequency (i.e., ratio of misfires to total firing intervals of the particular cylinder) before activating the display.

With regard to average acceleration determined in averaging block 20 in FIG. 3, a median filtered average is preferred. In other words, the average acceleration of a series of acceleration is that value of acceleration which has an equal number of acceleration values in the series that are greater than and less than the median value.

Preferably, the series of accelerations for determining an average acceleration value $A_i$ includes an odd number of consecutive acceleration measurements having the respective acceleration value of interest at the center. In other words, each series for the average acceleration $A_i$ is comprised of acceleration measurements $A_{i-n}, .. A_i, ... A_{i+n}$, where n is a whole number.

Figure 7:
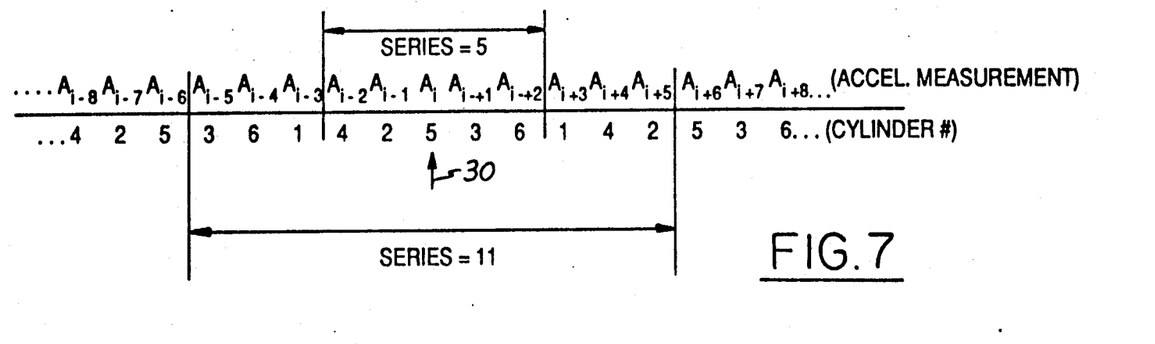
FIG. 7 shows the preferred series of acceleration measurements used in computing an average acceleration to remove engine operating transients.

If N is the number of cylinders in an internal combustion engine, the number of acceleration measurements within a series for computing an average acceleration is preferably equal to $2*N-1$. For example, as shown in FIG. 7, a preferred series of acceleration measurements for a six-cylinder engine includes 11 individual acceleration measurements since N equals 6. The i'th firing interval falling at the center of the series shown in FIG. 7 corresponds to cylinder No. 5 as indicated at arrow 30. The preferred series of measurements having 11 individual acceleration values centered on cylinder No. 5 includes measurements of the other cylinders No. 1-4 and 6 each twice, and only one measurement from cylinder 5 contributing to the average.

More generally, the number of acceleration measurements in a series can be equal to $x*N-1$, where x is a whole number (1, 2, 3, ...). Thus, when N equals 6 and x equals 1, the number of firing intervals in a series equals 5.

As mentioned above, an expected torque $\tau_i$ must be above a torque threshold $\tau_{th}$ in order to have a valid test condition. During conditions when the engine torque is very small, the resulting signal-to-noise ratio in the calculated power loss value is poor. In other words, a small value for torque in the denominator giving rise to the power loss value magnifies the effect of any noise present in the acceleration deviation measurements. By requiring expected torque $\tau_i$ to be above the threshold, false alarms resulting from noise are avoided.

When using the previously described torque threshold as the criteria for a valid test, it is possible to choose the torque threshold so as to exclude most rapid closed throttle decelerations while still allowing detection of misfires at engine idle. However, some marginal situations, primarily at high speeds, have been found to give a few false alarms even when that valid test criterion is met.

If desired to further improve the error rate of misfire detection, an alternative embodiment of the invention employs a combination of high speed and low torque in determining a valid test condition in order to improve accuracy in misfire detection and maximize the time when valid tests can be conducted.

Figure 9:
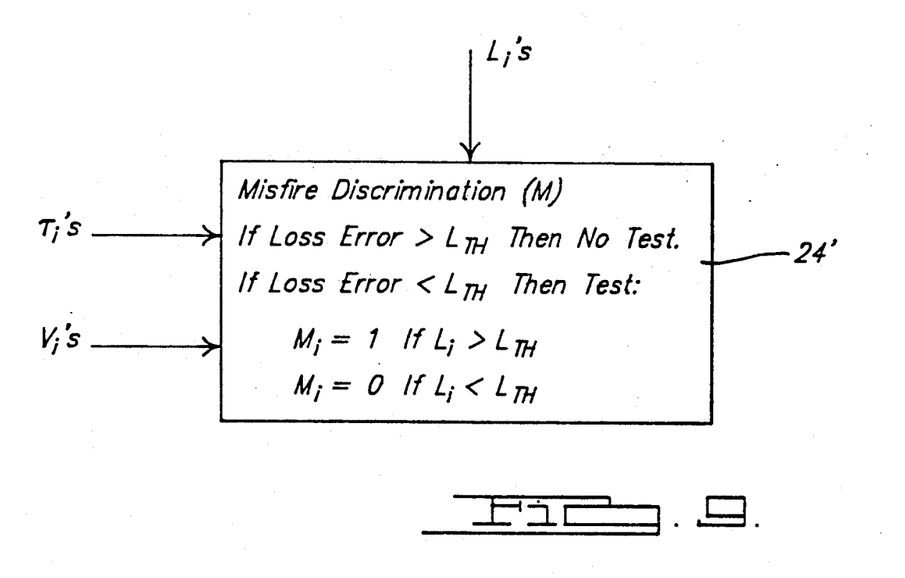
FIG. 9 shows a modified misfire discriminator in accordance with an alternative embodiment of the invention.

According to this alternative embodiment of the invention, the expected size of the noise in the power loss measurement is determined. The variation in the size of the power loss noise results from 1) the variation in the expected torque as previously described, and 2) the variation with engine speed in the noise level present in the acceleration deviation measurements themselves. The uncertainty in the acceleration deviation is due directly to uncertainty in the original acceleration calculations. The noise in the acceleration measurement increases strongly with increasing engine speed. Thus, a loss error is defined according to this alternative embodiment to identify valid test conditions where the loss error equals a constant (k) multiplied by engine rpm squared (RPM²) divided by the calculated expected torque ($\tau_i$). A loss threshold is then selected such that the loss error must be below the loss threshold in order to have a valid test, as shown in a modified discriminator and analyzer 24' in FIG. 9. Specifically, the valid test criterion in this embodiment is as follows:

$$loss\ error = k\ RPM^2/\tau_i\ and$$

$$loss\ error < loss\ threshold$$

where constant k is based on known or impirically derived parameters of the engine position measuring system. In particular, a value for k on the order of 0.1 representing the error present in the position marker for determining crankshaft rotational angle was determined for one particular system. However, at low engine speeds, a very low and unrealistic estimate of the error is predicted (i.e., approaching zero) by the formula provided above. Therefore, the rpm value may be replaced by a constant below an empirically determined engine speed.

Figure 8:
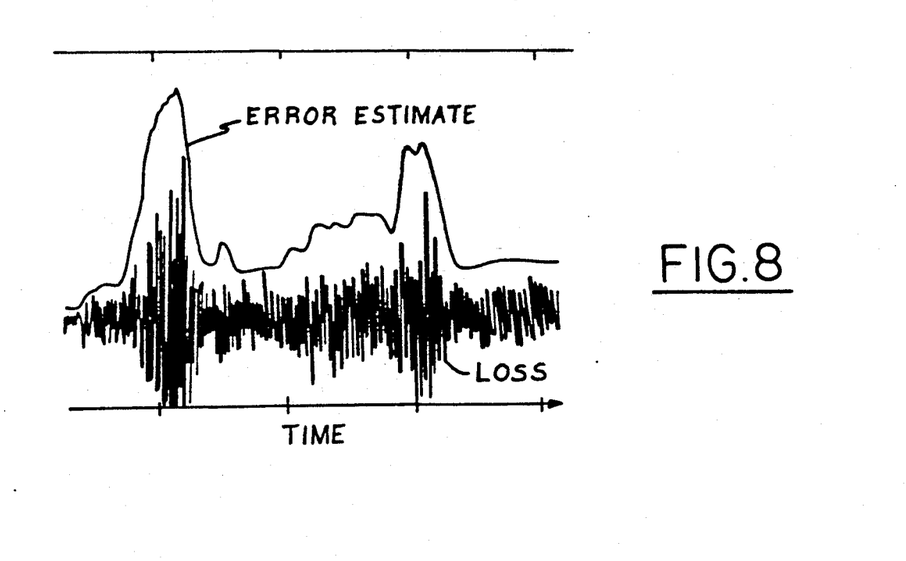
FIG. 8 is a plot of power loss and loss error during a period of transient engine operation.

FIG. 8 plots power loss and loss error each calculated according to this alternative embodiment of the invention. The power loss data was determined on an engine which was known to be free of misfires. The variations in power loss reflect both engine acceleration and deceleration as well as random and speed-dependent noise in the data. The calculated loss error provides a good fit to the envelope of the power loss data derived with no engine misfires. As a result, false alarms can be easily avoided without eliminating testing during conditions which would support an accurate test.

Turning again to FIG. 3, an alternative embodiment of the invention includes a bump sensor 27 connected to acceleration block 17 and discriminator and analyzer 24. The movement of a vehicle over and through road bumps and holes cause load changes that create torque perturbations that might propogate to the engine crankshaft. The torque perturbations alter the time measurements which are the basis for the velocity and acceleration measurements thereby introducing an error into the misfire detection system. A typical vehicle drivetrain has a frequency response which attenuates the torque perturbations at the crankshaft to a level below the perturbations caused by misfires However, it may be desirable to sense the occurrence of road bump induced load changes by sensing the height of the vehicle suspension using bump sensor 27 and providing a signal to discriminator and analyzer 24 such that no misfire test is made during times of extremely high rate of change of suspension height (since the engine load is then experiencing a transient condition). Alternatively, bump sensor 27 can provide data to acceleration block 17 so that the error introduced into the acceleration measurements can be corrected.

In a further embodiment of the invention, identification of the no-test condition is obtained by measuring the noise (i.e., likelihood of measurement errors) present in the acceleration measurements. Such measurement of the noise is independent of the source of noise, whether from road bumps or engine transients.

Figure 10:
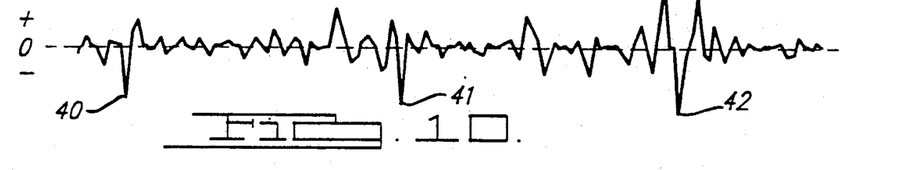
FIG. 10 is an additional plot of successive acceleration deviation values for illustrating a further embodiment of the invention.

As shown in FIG. 10, the value of acceleration deviation $D_i$ fluctuates around a value of zero. If acceleration was perfectly smooth (all cylinders producing equal power and no misfires) and if there was no noise in the velocity measurements, then $D_i$ would always be substantially zero. Thus, non-zero values of the acceleration deviation are caused by either (1) measurement noise, or (2) misfires.

Measurement of a time varying noise strength provides the ideal detection of a no-test condition. However, the noise cannot be determined from all the values of the acceleration deviations measurements because misfires will cause deviation values not related to noise (e.g., FIG. 10 represents acceleration deviation values obtained during engine operation with deliberately introduced misfires shown at 40, 41 and 42). As a result, any noise information identifying the presence of road bumps or engine transients is mixed together with the misfire information. However, since each misfire only creates a negative acceleration deviation while noise creates both positive and negative acceleration deviations, information about the noise can be separated by considering only the positive acceleration deviation values.

Figure 11:
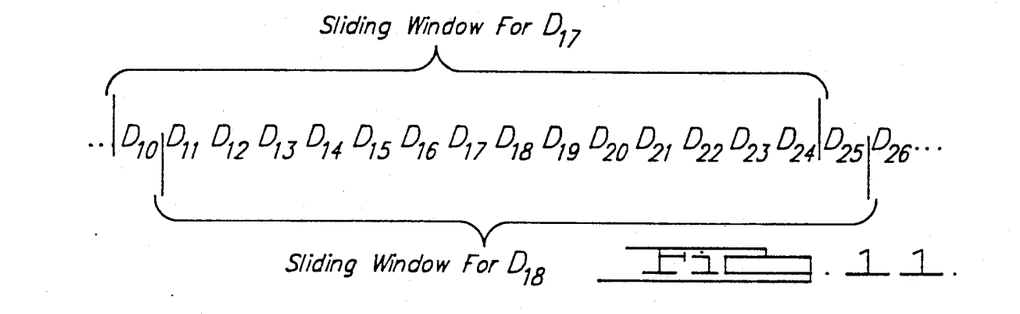
FIG. 11 shows the use of a sliding window over the deviation of acceleration values used in measuring noise.

Since noise effects are temporally localized, a sliding window of acceleration values centered on the selected cylinder firing is employed for obtaining the respective noise measurement as shown in FIG. 11. The number of acceleration deviations values contained within the sliding window preferably includes $D_i$ values for cylinder firings over several engine cycles A preferred sliding window contains about 30 acceleration deviation values, although 15 values are shown in the sliding window in FIG. 11 to simplify the drawing. Thus, for a selected cylinder firing where i=17 and having acceleration deviation $D_{17}$, the sliding window includes acceleration deviations $D_{10}$ through $D_{24}$. The measured noise value is proportional to the maximum positive value within the window. Thus, a function "max_window" is defined which produces the maximum within the window.

Figure 12:
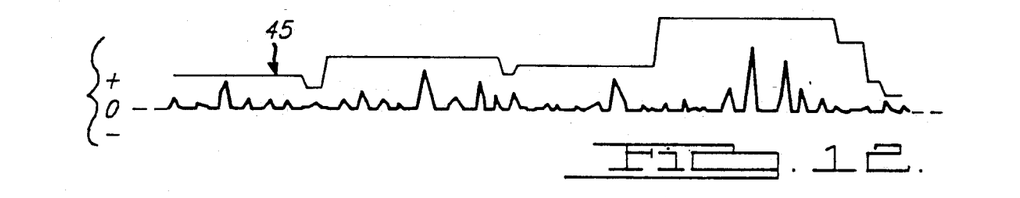
FIG. 12 shows the positive deviation of accleration values of FIG. 10 and a measured noise envelope determined using a sliding window

As shown in FIG. 12, a noise envelope 45 is determined according to the maximum value in the sliding window. Only positive acceleration deviation values are shown in FIG. 12. Since the negative valued noise effects (which are present but cannot be measured) are not necessarily limited to having an absolute magnitude less than or equal to the positive values which are measured, noise envelope 45 is obtained by multiplying the maximum sliding window value by a predetermined factor to account for the maximum expected variability, in the range of from about 1 to about 2 and typically about 1.5.

When the measured noise exceeds a threshold, then the no-test condition is present and a misfire cannot reliably be detected.

Figure 13:
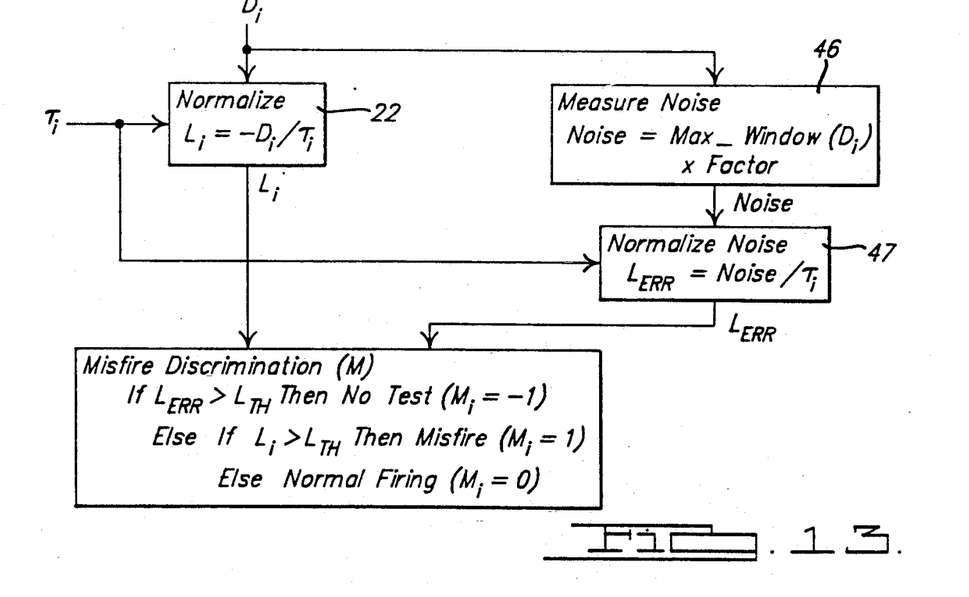
FIG. 13 is a block diagram showing misfire detection in which the occurrence of a no-test condition is determined by measured noise contained in the power loss parameter.

A block diagram showing a first method and apparatus for noise measurement and detecting of a no-test condition is shown in FIG. 13. The acceleration deviation measurements D are provided to normalization block 22 as discussed with reference to FIG. 3. The acceleration deviation values are also provided to a noise measuring block 46 wherein a noise value corresponding to each cylinder firing i is determined by the formula:

$$noise = max\_window(D_i) \cdot factor$$

where max_window is the function previously described with reference to FIG. 11 and factor is a predetermined number preferably equal to about 1.5.

The resulting noise value and the expected torque value $\tau_i$ are provided to noise normalization block 47. A loss error $L_{ERR}$ which corresponds to the measured noise is calculated by dividing the noise measurement corresponding to cylinder firing i by $\tau_i$.

The power loss value $L_i$ and the normalized loss error $L_{ERR}$ are provided to misfire discrimination block 48. The noise measure $L_{ERR}$ is compared to a predetermined loss threshold $L_{th}$. If $L_{ERR}$ is greater than $L_{th}$, then the no-test condition is present and the misfire discriminator output $M_i$ is assigned a value of $-1$. If $L_{ERR}$ is not greater than $L_{th}$, then the power loss $L_i$ is compared to the loss threshold $L_{th}$. If $L_i$ is greater than $L_{th}$, then a misfire is detected and $M_i$ is assigned a value of 1, otherwise a normal firing is detected and $M_i$ is assigned a value of zero.

Figure 14:
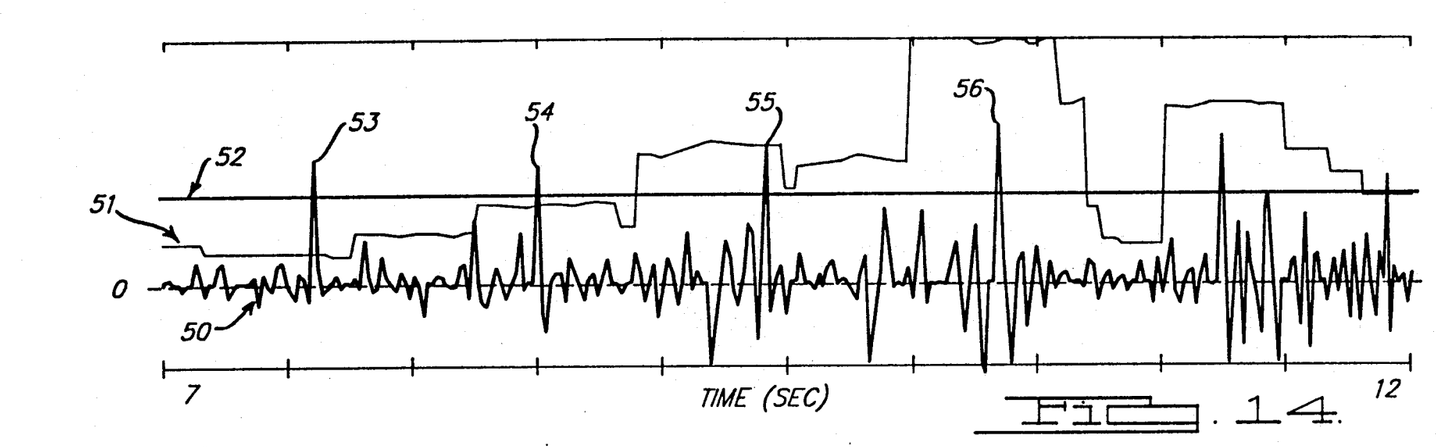
FIG. 14 plots power loss and measured loss error for the acceleration values shown in FIG. 10.

FIG. 14 plots values calculated according to the system shown in FIG. 13 using actual acceleration measurements obtained during operation of a vehicle with regularly introduced misfires. The power loss values are plotted in curve 50 and loss error $L_{ERR}$ is shown as curve 51. The predetermined threshold $L_{th}$ is shown at 52. Deliberately introduced misfires are shown at points 53, 54, 55, and 56. Acceleration data was collected during throttle transients and during driving of a vehicle over road bumps. When curve 51 is below threshold 52, then a no-test condition is not present and a misfire can be reliably detected when curve 50 exceeds threshold curve 52, as at points 53 and 54. However, when curve 51 rises above threshold 52, excessive noise prevents reliable identification of misfires and a no-test condition is detected. Thus, actual misfires at points 55 and 56 are not identified as misfires since the no-test condition prevails. Although actual misfires may be missed, the no-test condition prevents noise from causing a normal firing to be misidentified as a misfire.

Figure 15:
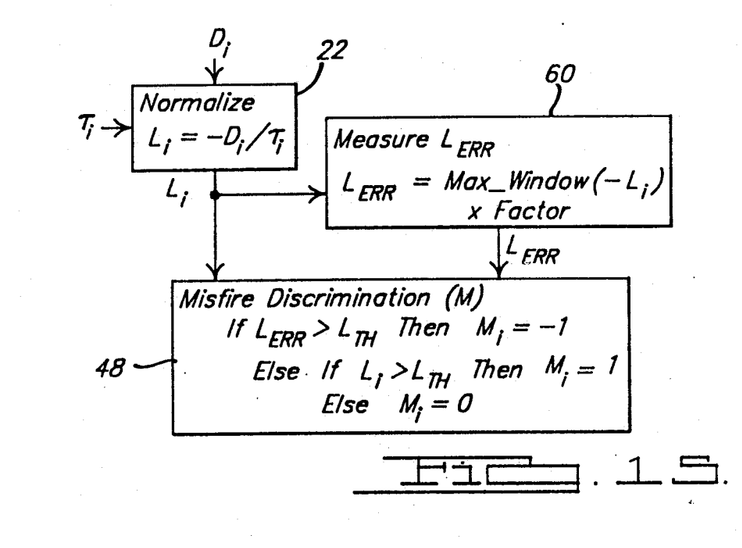
FIG. 15 is a block diagram showing an alternative means and method for misfire detection in which the occurrence of a no-test condition is determined by measured noise contained in the power loss parameter.

FIG. 15 shows a second method and apparatus for measuring noise to detect a no-test condition. In this embodiment, normalization of the acceleration deviation is performed before applying the sliding window function. Thus, normalization block 22 provides power loss values $L_i$ to loss error measurement block 60 and to misfire discrimination block 48. Loss error $L_{ERR}$ is determined in block 60 according to the formula $$L_{ERR} = max\_window(-L_i) \cdot factor.$$

The resulting values are plotted in FIG. 16 for the same acceleration measurements as plotted in FIG. 14, the primary difference between FIGS. 16 and 14 being that the loss error curve (FIG. 16) includes flat sections.

Figure 17:
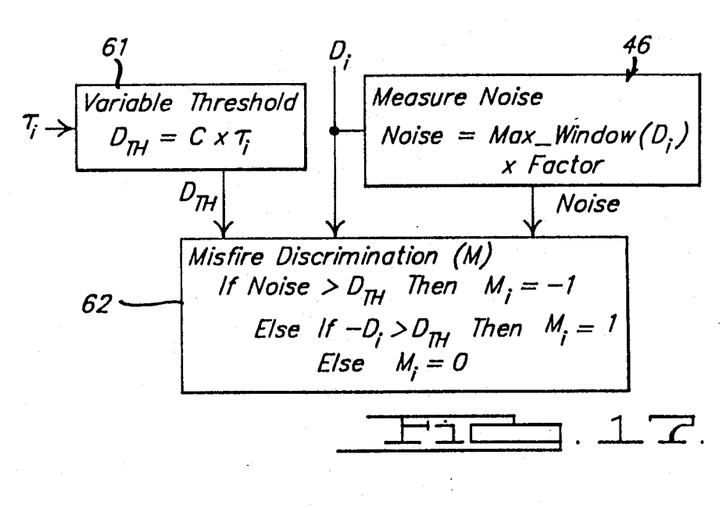
FIG. 17 is a block diagram showing an alternative embodiment of misfire detection using a variable threshold and in which the occurrence of a no-test condition is determined by a comparison of measured noise with the variable threshold.

The effect of normalization of the noise measurements (or the power loss measurements) can alternatively be achieved using a variable threshold as shown in FIG. 17, i.e., the normalizing parameter (torque) operates on the threshold rather than on the engine acceleration. This use of a variable threshold is mathematically equivalent to the previous embodiments.

In FIG. 17, expected torque $\tau_i$ is provided to a variable threshold block 61 where a variable threshold $D_{th}$ is determined equal to a constant C times $\tau_i$. Variable threshold $D_{th}$ is provided to a misfire discrimination block 62.

The acceleration deviation values $D_i$ are provided to misfire discrimination block 62 and to noise measuring block 46. The measured noise from block 46 is also provided to misfire discrimination block 62.

The value of constant C used in block 61 is preferably substantially equal to the predetermined loss threshold employed in the embodiment of FIGS. 13 and 15. Thus, the measured noise is compared to the variable threshold to detect a no-test condition, i.e. if noise is greater than $D_{th}$ then $M_i$ is assigned a value of $-1$. Otherwise, if noise does not exceed the variable threshold, then the sign of the acceleration deviation value $D_i$ is changed and the value compared to the variable threshold. If negative $D_i$ is greater than $D_{th}$, then a misfire is detected (i.e., $M_i$ is assigned a value of one), otherwise a normal firing is detected.

FIG. 18 plots the values calculated by the embodiment of FIG. 17 using the same data employed for FIGS. 14 and 16. In FIG. 18, acceleration deviation values $D_i$ are plotted at curve 63. Measured noise is plotted at curve 45 and the variable threshold $D_{th}$ is plotted at curve 64. A no-test condition results when curve 45 exceeds curve 64. The sign of the values in curve 63 are inverted prior to comparison with variable threshold curve 64 to detect the occurrence of misfires.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method of detecting misfires of individual cylinder firings in a combustion engine wherein each individual cylinder firing is classified as a misfire, a normal firing, or as occurring during a no-test condition, said method comprising the steps of:

measuring engine acceleration corresponding to each of a plurality of cylinder firings during operation of said engine;

selecting one of said cylinder firings for detection;

determining an average acceleration over a series of said cylinder firings substantially centered on said selected cylinder firing;

determining deviation of said measured acceleration from said average acceleration for each of a group of said cylinder firings including said selected cylinder firing;

determining a noise parameter according to a maximum magnitude of said deviations of acceleration; and comparing said noise parameter to a threshold to detect said no-test condition 2. The method of claim 1 further comprising the step of:
if said no-test condition is not detected, then classifying said selected cylinder firing as a misfire or a normal firing in response to the deviation of acceleration corresponding to said selected cylinder firing and a torque-related value corresponding to said selected cylinder firing.

3. The method of claim 1 wherein said noise parameter depends on a torque-related value 4. The method of claim 1 wherein said threshold depends on a torque-related value.

5. The method of claim 1 wherein said maximum magnitude of said deviations of acceleration is determined according to a sliding window defining said group and substantially centered on said selected cylinder firing.

6. The method of claim 5 wherein said noise parameter is determined according to said maximum magnitude multiplied by a predetermined factor.

7. The method of claim 5 wherein said noise parameter is determined according to said maximum magnitude multiplied by a predetermined factor and divided by a torque-related value.

8. The method of claim 5 wherein said group is comprised of about 30 consecutive cylinder firings.

9. A method of detecting misfires of individual cylinder firings in a combustion engine wherein each individual cylinder firing is classified as a misfire, a normal firing, or as occurring during a no-test condition, said method comprising the steps of:
measuring engine acceleration corresponding to each of a plurality of cylinder firings during operation of said engine;
selecting one of said cylinder firings for detection;
determining an average acceleration over a series of said cylinder firings substantially centered on said selected cylinder firing;
determining deviation of said measured acceleration from said average acceleration for each of a group of said cylinder firings including said selected cylinder firing;
determining a respective torque-related value coinciding with each of said cylinder firings in said group;
normalizing each of said deviations of acceleration in response to a respective torque-related value;
determining a noise parameter according to a maximum magnitude of said normalized deviations of acceleration; and
comparing said noise parameter to a first threshold to detect said no-test condition.

10. The method of claim 9 further comprising the step of:
if said no-test condition is not detected, then classifying said selected cylinder firing as a misfire or a normal firing in response to a comparison between said normalized deviation of acceleration corresponding to said selected cylinder firing and a second threshold.

11. The method of claim 10 wherein said first threshold and said second threshold are equal.

12. The method of claim 9 wherein said maximum magnitude of said normalized deviations of acceleration is determined according to a sliding window defining said group and substantially centered on said selected cylinder firing.

13. The method of claim 12 wherein said noise parameter is determined according to said maximum magnitude multiplied by a predetermined factor.

14. Apparatus for detecting misfires of individual cylinder firings in a combustion engine wherein each individual cylinder firing is classified as a misfire, a normal firing, or as occurring during a no-test condition, said method comprising the steps of:
measuring means for measuring engine acceleration corresponding to each of a plurality of cylinder firings during operation of said engine;
averaging means coupled to said measuring means for determining an average acceleration over a series of said cylinder firings substantially centered on said selected cylinder firing;
deviation means coupled to said measuring means and said averaging means for determining deviation of said measured acceleration from said average acceleration for each of a group of said cylinder firings including said selected cylinder firing;
noise means coupled to said deviation means for determining a noise parameter according to a maximum magnitude of said deviations of acceleration; and
comparing means coupled to said noise means for comparing said noise parameter to a threshold to detect said no-test condition.

* * * * *